US006922672B1

United States Patent
Hailpern et al.

(10) Patent No.: US 6,922,672 B1
(45) Date of Patent: Jul. 26, 2005

(54) DYNAMIC METHOD AND APPARATUS FOR TARGET PROMOTION

(75) Inventors: Brent Tzion Hailpern, Katonah, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 09/232,751

(22) Filed: Jan. 15, 1999

(51) Int. Cl.⁷ .............................................. G06F 17/60
(52) U.S. Cl. ............................. 705/14; 705/10; 705/26
(58) Field of Search ............................. 705/14, 10, 26, 705/27; 235/378, 379, 579

(56) References Cited

U.S. PATENT DOCUMENTS

| | | | | |
|---|---|---|---|---|
| 4,908,761 A | * | 3/1990 | Tai ................................ | 705/14 |
| 5,446,919 A | * | 8/1995 | Wilkins ........................ | 725/35 |
| 5,515,098 A | * | 5/1996 | Carles .......................... | 725/35 |
| 5,774,170 A | * | 6/1998 | Hite et al. ..................... | 725/35 |
| 5,933,813 A | * | 8/1999 | Teicher et al. ................ | 705/26 |
| 5,943,653 A | * | 8/1999 | Ross et al. .................... | 705/14 |
| 5,950,125 A | * | 9/1999 | Buhrmann et al. ......... | 455/422 |
| 5,974,396 A | * | 10/1999 | Anderson et al. ............ | 705/14 |
| 6,026,369 A | * | 2/2000 | Capek .......................... | 705/14 |
| 6,026,370 A | * | 2/2000 | Jermyn ........................ | 705/14 |
| 6,029,139 A | * | 2/2000 | Cunningham et al. ....... | 705/14 |
| 6,047,310 A | * | 4/2000 | Kamakura et al. .......... | 709/201 |
| 6,047,327 A | * | 4/2000 | Tso et al. ..................... | 709/223 |
| 6,055,573 A | * | 4/2000 | Gardenswartz et al. ...... | 705/26 |
| 6,061,658 A | * | 5/2000 | Chou et al. ................... | 705/10 |
| 6,068,183 A | * | 5/2000 | Freeman et al. ............. | 235/375 |
| 6,073,112 A | * | 6/2000 | Geerlings ..................... | 705/14 |
| 6,075,971 A | * | 6/2000 | Williams et al. .............. | 705/14 |
| 6,144,944 A | * | 11/2000 | Kurtzman, II et al. ....... | 705/14 |
| 6,182,050 B1 | * | 1/2001 | Ballard ........................ | 705/14 |
| 6,219,696 B1 | * | 4/2001 | Wynblatt et al. ............. | 705/14 |
| 6,236,975 B1 | * | 5/2001 | Boe et al. ..................... | 705/14 |
| 6,236,977 B1 | * | 5/2001 | Verba et al. .................. | 705/14 |
| 6,256,498 B1 | * | 7/2001 | Ludwig ....................... | 455/433 |
| 6,308,202 B1 | * | 10/2001 | Cohn et al. .................. | 709/217 |
| 6,332,127 B1 | * | 12/2001 | Bandera et al. .............. | 705/14 |
| 6,356,761 B1 | * | 3/2002 | Huttunen et al. ........... | 455/456 |
| 6,381,465 B1 | * | 4/2002 | Chern et al. ................. | 455/466 |
| 6,421,716 B1 | * | 7/2002 | Eldridge et al. ............. | 709/219 |
| 6,446,076 B1 | * | 9/2002 | Burkey et al. ............... | 707/102 |

FOREIGN PATENT DOCUMENTS

| | | | |
|---|---|---|---|
| EP | 0769749 A2 | * | 4/1997 |
| EP | 0923039 A1 | * | 6/1999 |
| WO | WO-97/20279 A1 | * | 6/1997 |
| WO | WO-99/56144 A1 | * | 11/1999 |

OTHER PUBLICATIONS

Thayer, Warren, "Database Marketing Demystified", Progressive Grocer, vol. 68, No. 11, Nov. 1989.*

Moretti, Peggy, "Choosing the right Agency for the Next Generation of Consumer Telemarketing", Telemarketing Magazine, vol. 12, No. 1, pp. 32–34, Jul. 1993.*

Affinicast Corp., "Affinicast Enables Web Sites Than Listen and Adapt to Consumer Affinities", Press Release, PR Newswire Association, pp. 1–3, Dec. 03, 1996.*

Anonymous, "Lycos: AOL Europe Search Engine NetFInd Supported by Lycos", Press Release, Dialog File 810:Business Wire, May 28, 1998.*

* cited by examiner

*Primary Examiner*—John W. Hayes
(74) *Attorney, Agent, or Firm*—F. Chau & Associates, LLC

(57) ABSTRACT

A system and method for providing target groups of customers with a plurality of promotions for a plurality of goods. Active customers are tracked for each target group. Active customers can include customers with portable devices, customers with hand-held devices, customers who are viewers of a pay-per-view system and customers who are viewers of a web site. The promotions for each target group are calculated based on the promotional objectives for each target group and the conditions in the operating environment. Selected promotions are sent the active customers for each target group.

18 Claims, 8 Drawing Sheets

DYNAMIC METHOD AND APPARATUS FOR TARGET PROMOTION

FIELD OF THE INVENTION

The present invention relates generally to targeting promotions towards a group of customers. It specifically relates to real-time detection of the target group and adaptively selecting the promotion based on characteristics of the target group.

BACKGROUND OF THE INVENTION

For traditional advertisement and promotion, the main control an advertiser has is the selection of the media where the advertisement/promotion appears. For example, if the advertiser of a tennis racket thinks potential buyers may also be interested in reading the Sports Illustrated magazine, then the advertiser can place an advertisement in that magazine. That is to say the advertisers mainly use the profile of the potential buyers to identify the media that can attract an audience with the similar profile to place an advertisement.

While using the profile of the potential buyer to identify the media of the advertisement is a well known method of targeting prospective buyers, this method may be very inefficient. For example, the profile being used may be fairly imprecise. If it is desired to target a group having certain characteristics, the profile of the group that may be exposed to the advertising medium may only overlap, to a limited extent, the profile of the group to which is desired that the advertisement be directed. Furthermore, once such a targeted group has been identified, it is difficult to track the customers in the group and to identify customers who may be eligible for inclusion in that group.

Furthermore, as inventory or wholesale pricing changes, it may be very difficult to modify the form of the advertising and the target group for the advertising in accordance with the other changes. For example, if inventory on one product is scarce, it may not be desirable to actively advertise for that product. Furthermore, while inventory for another product may increase, advertisement for that product in order to increase sales may be desirable. With traditional advertising techniques, the ability to dynamically modify the type of advertising may be fairly limited.

SUMMARY OF THE INVENTION

Target groups of customers are provided with a plurality of promotions for a plurality of goods. The system tracks active customers for all target groups. The characteristics of each target group are then calculated based on the active customers of each target group. The promotions for each target group are calculated based on the promotional objectives for each target group using a given set of promotional candidates. The promotional objectives for each target group include the target group characteristics.

BRIEF DESCRIPTION OF THE DRAWINGS

The invention is best understood from the following detailed description when read in connection with the accompanying drawings. Included in the drawings are the following figures.

DETAILED DESCRIPTION OF THE INVENTION

Figure 1A:
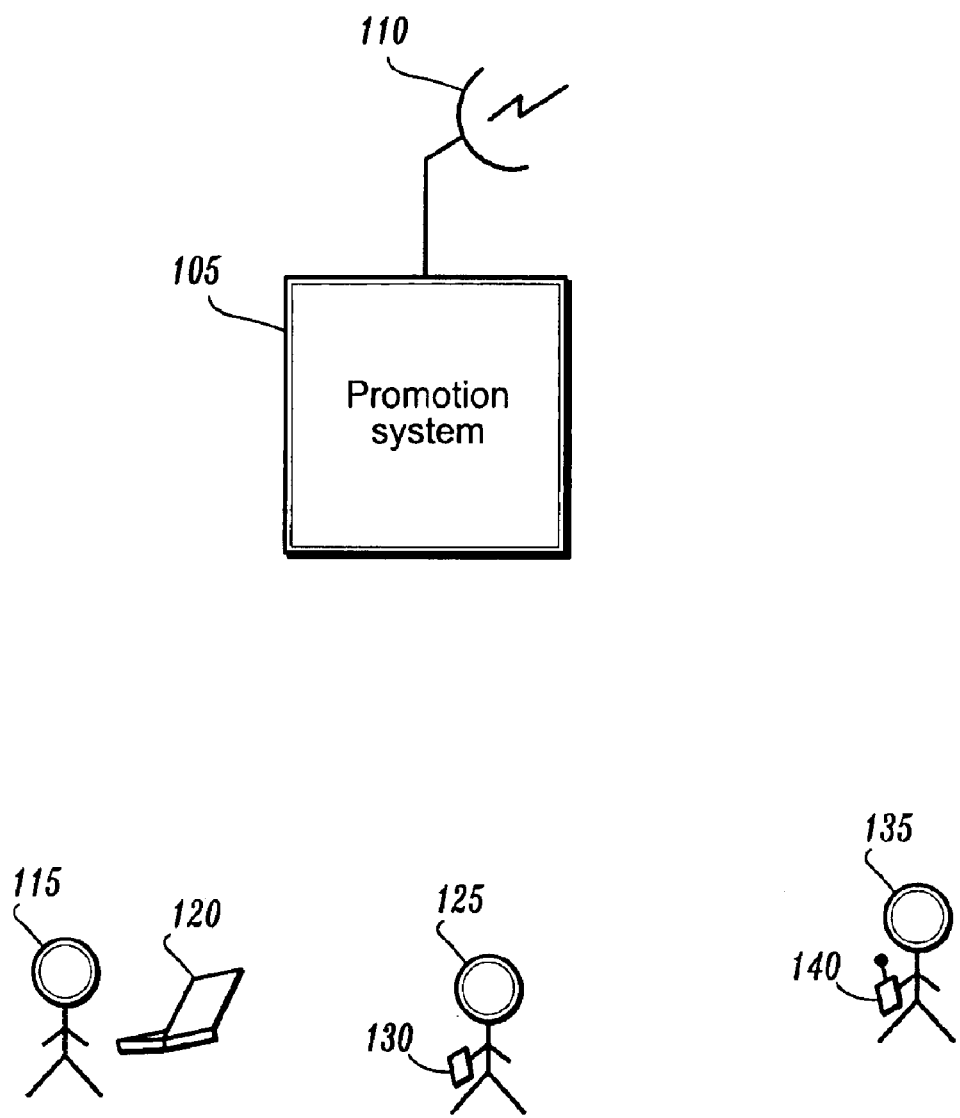
FIG. 1A is a block diagram of an environment having features of the present invention.

The ability to track customers through electronic means is well known in the art. For example, current pager technology allows for the identification of a pager within a particular geographic area. Similarly, if a plurality of customers are each wearing a device incorporating similar technology, it is possible to tell whether the customers are within a particular range. Furthermore, such technology allows the ability to assign a unique identification number to each such device. Thus, it is possible to determine the identification numbers of those devices within a particular geographical area. By assigning each identification number to an individual customer, it is possible to determine which customers are within a particular geographical area.

In an exemplary embodiment of the present invention, a target group of customers is identified. This target group of customers is provided with a promotion. The target group of customers may be selected based upon various data which has been previously collected including, for example, customer age, customer spending patterns, customer gender, customer salary, customer residential address, etc. Such data may be obtained from a variety of sources (e.g., known sources of demographic data).

In an exemplary embodiment of the present invention, a business wishes to modify the sales activity on a particular product or service that they provide. For example, the business may be trying to sell a product for which they are overstocked. Or, the business may be trying to sell a product which they were able to purchase at a comparatively low wholesale price. Thus, the business is interested in encouraging customers to purchase as much of this product as possible. Conversely, the business may provide a product or service for which their stock is very low. Encouragement for the purchase of that product may not be desirable. If the business has a product or service for which demand is very high, then the business may wish to increase knowledge (and pricing) that they have this product in stock in order to increase their profits. The business may have a product or service for which demand is very low. Additional incentives may be desirable in order to "move" a product so that it is purchased customers. Simply put, the environment in which products or services are sold may be very dynamic (even volatile). Thus, it is desirable to attempt to influence the buying behavior of customers in accordance with the various changes in the business environment.

One way to influence the purchasing behavior of customers is by providing the customers with promotions (or other advertising). A promotion creates a modification in the price of a particular product or service. Once a customer is provided with the promotion, the customer may use the promotion in order to obtain a decrease in the cost of the product or service.

Promotions can take several forms. A promotion may be percentage off. A promotion may be a fixed dollar amount off. A promotion may expire within a predetermined period of time. A promotion may be contingent on the purchase of a certain quantity of product. A promotion may be contingent upon the purchase of a different product.

In an exemplary embodiment of the present invention, it is desired to provide certain promotions to various target customer groups. This information may be obtained from demographic data. For example, if it is known that a certain type of automobile is typically purchased by individuals who are at a particular income level, a promotion to increase the sales of that automobile is desirably targeted to the target group of customers may be that income level. As another example, if it is desirable to increase the sales of a particular product within several hours, the target group of customers is those customers who are geographically located near the store which is selling the product. As a further example, certain products or services may be more desirable to men or women. Promotions for those particular products or services are desirably targeted to men and women as appropriate. Thus, the products or services receiving promotions may change, the form of the promotion may change, and the target groups may change.

Electronic commerce provides an opportunity to make one-to-one tailoring of the promotion to a potential customer if the commerce system can identify relevant customer information such as purchase history.

With the rapid advancement of semiconductor, storage and display technologies, hand held or mobile devices have become increasingly versatile and popular. A hand held device with two-way communications capability can not only receive information including advertisement and promotion, but (as previously described) also can send a signal to notify its presence in a neighborhood. Similarly, in a cable TV, pay per view, or Web environment, it is possible to accomplish two communications including notification of presence and receipt of advertising and promotion.

It is thus desirable to allow other factors, such as availability of the service capacity or the inventory level to be taken into consideration to select the promotions in real-time to the target group. It is desirable to target a group of customers in real-time, and to send promotions to those customers based on the target group characteristics and other product and store considerations.

FIG. 1A depicts an exemplary embodiment the present invention. Promotion system 105 can be implemented on a computing server. Promotion system 105 includes a communication mechanism such as an RF transceiver to identify and track the customers in the target customer group that carry communications device 110.

A customer of a target group is defined as active once the customer is identified and tracked through the use of communications device 110. Customers 115, 125 and 135 can each carry communications device 110 which may be a portable device such as laptop 120, pager 125 and Palm PC 140 with two-way communications capability to interact with the promotion system 105.

Figure 1B:
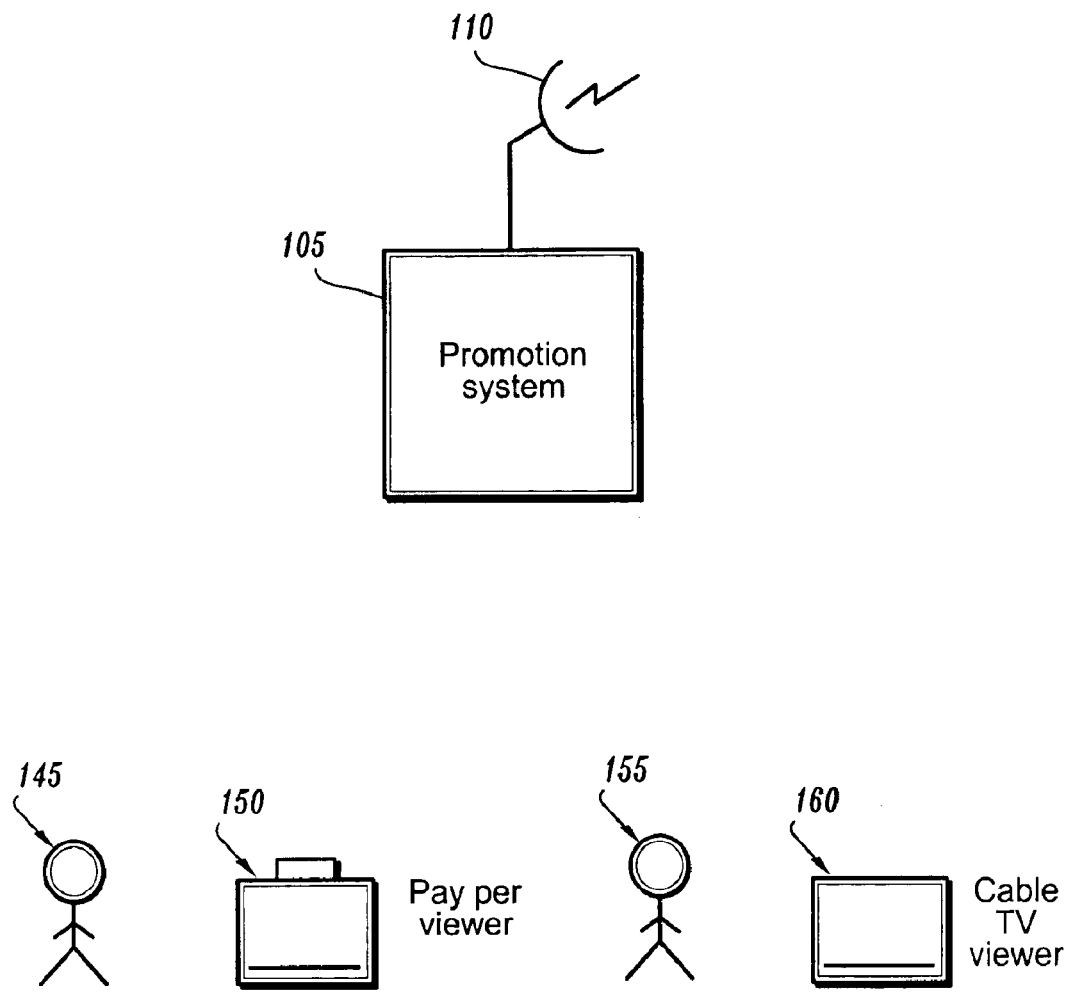
FIG. 1B is a block diagram of another environment having features of the present invention.
Figure 1C:
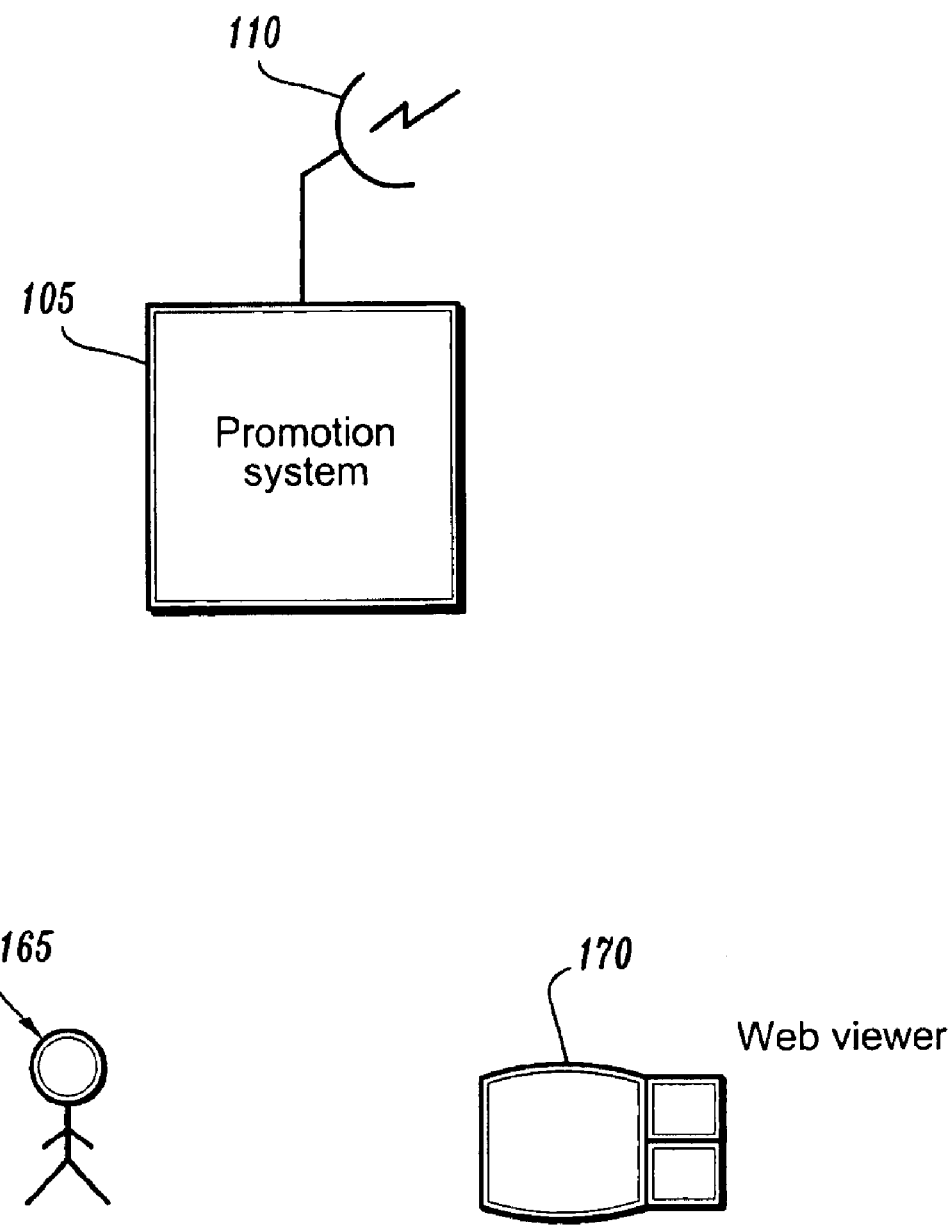
FIG. 1C is a block diagram of another environment having features of the present invention.

Those skilled in the art will also appreciate that there are many other configurations to the one specified in FIG. 1A of the preferred embodiment of the present invention. For example, as shown in FIG. 1B, in a cable or pay per view system, it is known in the art that the current active viewers 150 in a local area can be identified so that local target promotion can be sent to the local audience. FIG. 1C shows another example, in a Web viewer 170, in which a cookie mechanism can be used to identify the active sessions on a Web site. Again, using cookie mechanisms to identify Web site visitors is know in the art.

Figure 2:
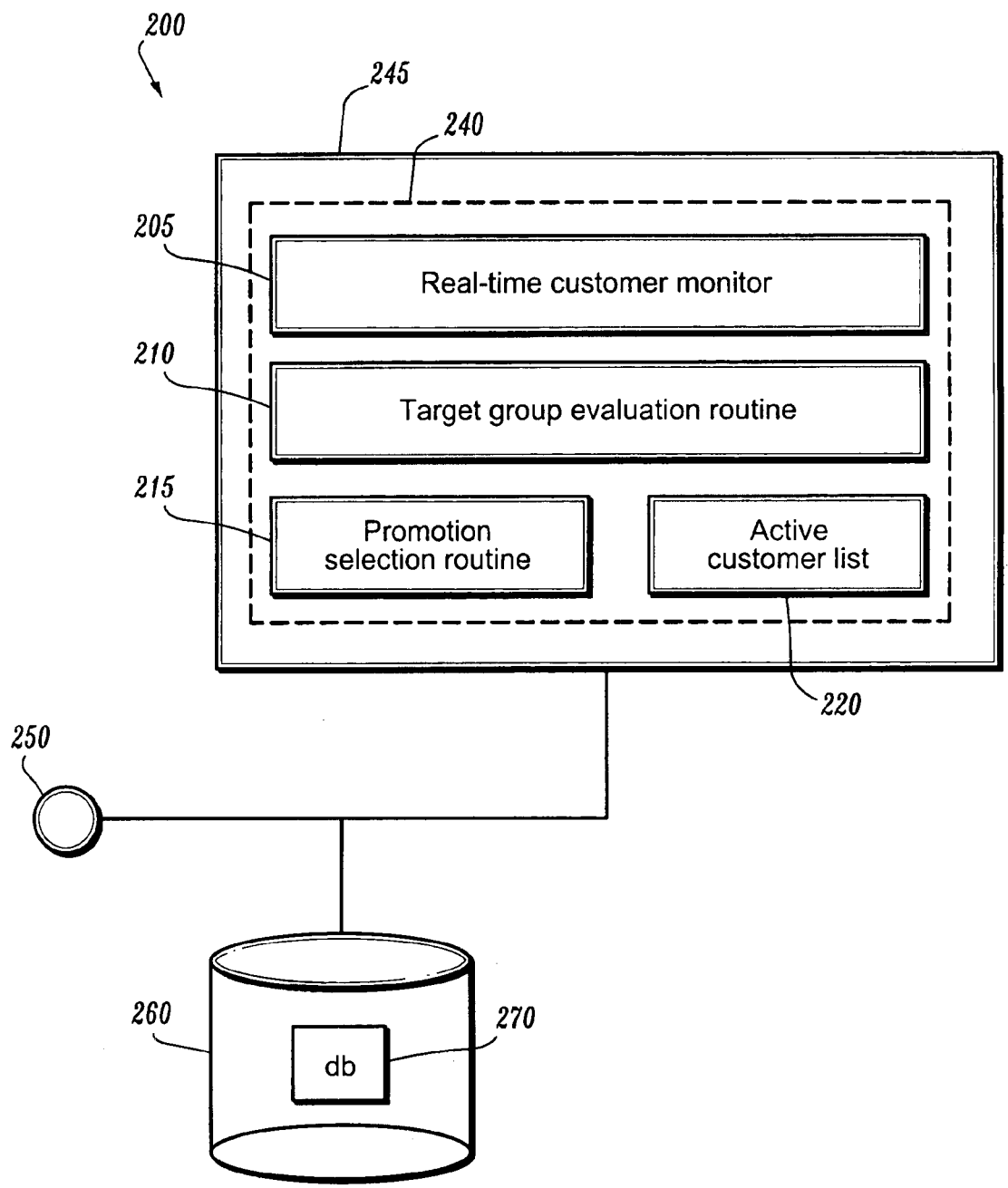
FIG. 2 is a block diagram of an exemplary data processing architecture in accordance with an exemplary embodiment of the present invention.

Various promotions are made available to target customer groups through the use of promotion system 200, shown in FIG. 2. Promotion system 200 can include a CPU 250, memory 245 such as RAM, and storage devices 260 such as DASD. The memory 245 stores the dynamic target promotion logic 240 (with details depicted in FIG. 3) preferably embodied as computer executable code which may be loaded from DASD 260 into memory 245 for execution by CPU 250. The dynamic target promotion logic 240 includes a real-time customer monitor 205 (with details depicted in FIG. 4), a target group evaluation routine 210 (with details depicted in FIG. 5), and a promotion selection routine 215 (with details depicted in FIG. 6). It also maintains an active customer list 220. It may optionally maintain a customer database 270 to track customer profile information or buying history, which can either reside in disk 260 or in main memory 245.

Figure 3:
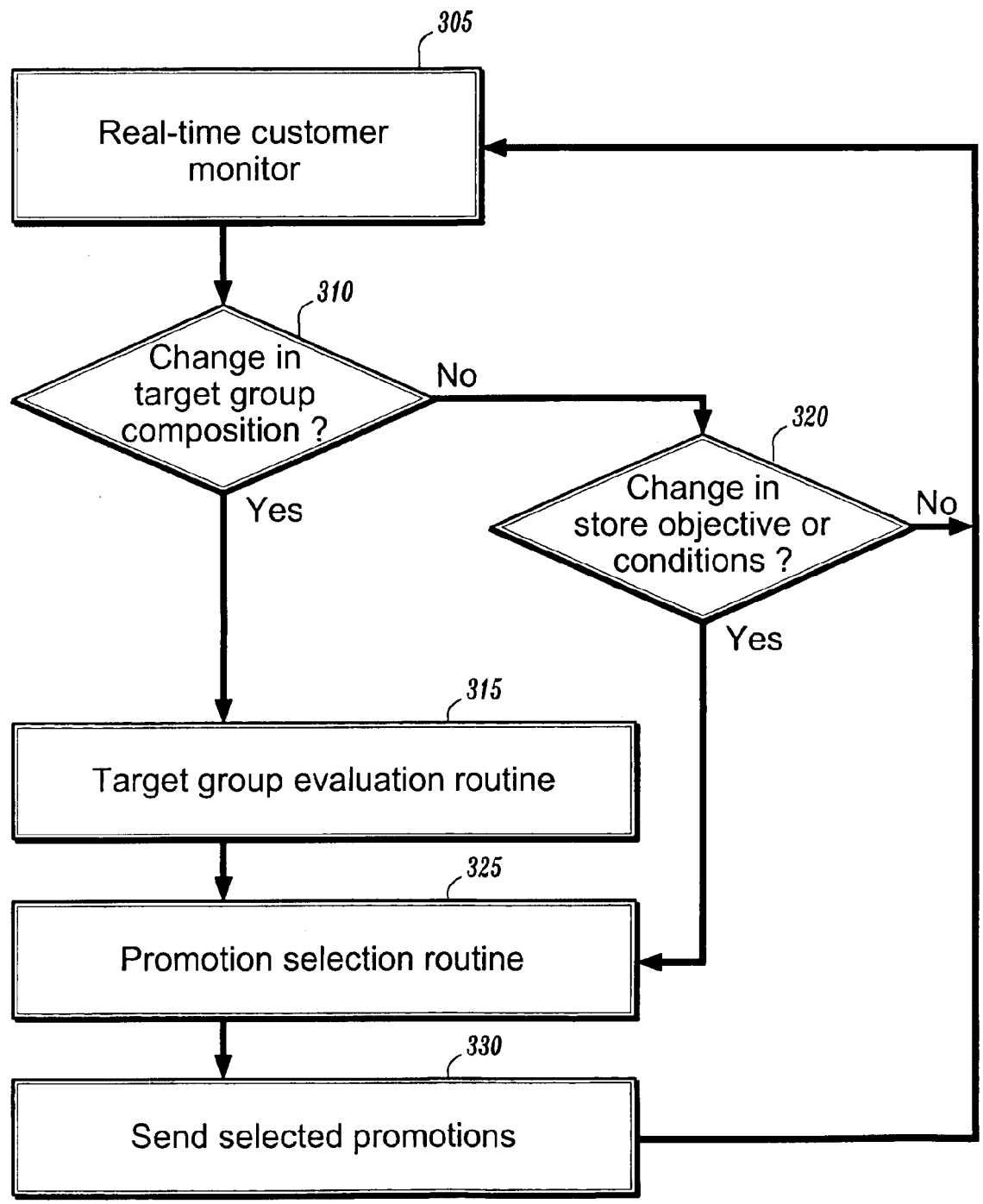
FIG. 3 is a flow chart diagram illustrating the dynamic target promotion system of FIG. 2.

FIG. 3 depicts a flow chart diagram which illustrates the operation of dynamic target promotion system 240 in accordance with an exemplary embodiment of the present invention. At step 305, the real-time customer monitor (with details depicted in FIG. 4) is invoked. At step 310, it is checked if the customers which comprise the target group have changed. This may occur, for example, if a potential customer leaves the geographical area in which customers are targeted to receive promotions. If there are changes, at step 315, the target group evaluation routine (with details depicted in FIG. 5) is invoked. At step 320, it is checked if there are changes in the store conditions (such as available service capacity or inventory level) or objectives. Thus, for example, the inventory of a particular product may change. If the inventory or service capacity is high, then promotion may be desirable. If inventory or service capacity is low, promotion may not be desirable. Thus, as conditions change, it may be desirable to select a different target group to receive the promotions. At step 325, the promotion selection routine (with details depicted in FIG. 6) is invoked. At step 330, the selected promotions are sent to the target customer group. The promotion may be sent in the form of a message to communications device 110. The message may be downloaded, printed or displayed from communications device 110 and given to the store in order to receive the discount (or other bonus) associated with the promotion.

Figure 4:
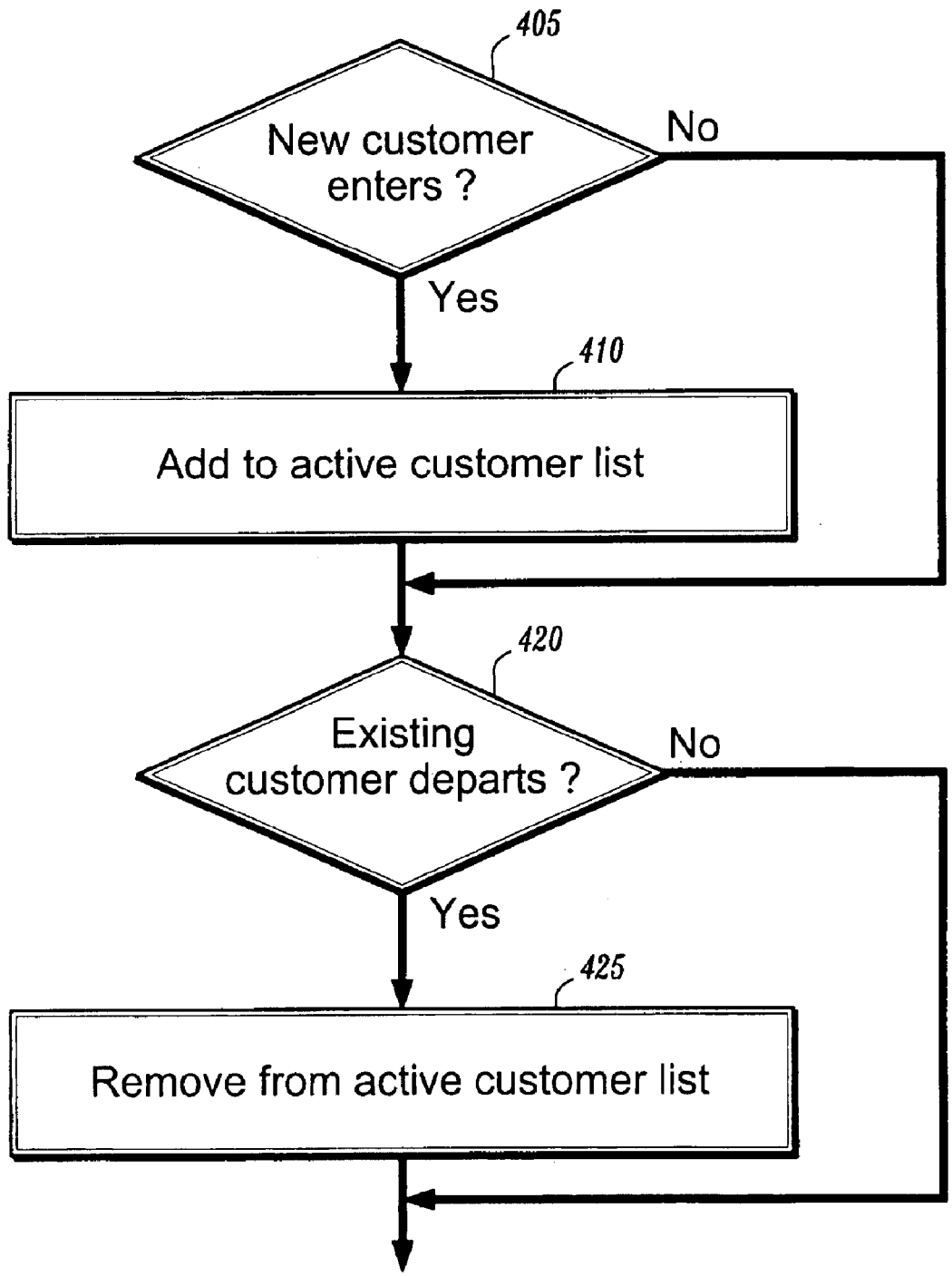
FIG. 4 is a flowchart diagram illustrating the real-time customer monitor operation of FIG. 2.

FIG. 4 depicts the flow chart diagram of the real-time customer monitor 205 operation. At step 405, it is checked if there are any newly arrived customers. Again, present technology allows for the determination of whether communication devices (pagers, for example) are within a certain geographic area. By assigning a communications device with a unique identification code to each customer, one of ordinary skill in the art could readily determine whether customers wearing the communication device enter or exit the geographical area. If there are newly arrived customers, then at step 410, these newly arrived customers are added to the active customer list 220. At step 420, it is checked whether existing customers have departed. If so, at step 425, the departed customers are removed from the active customer list 220.

Figure 5:
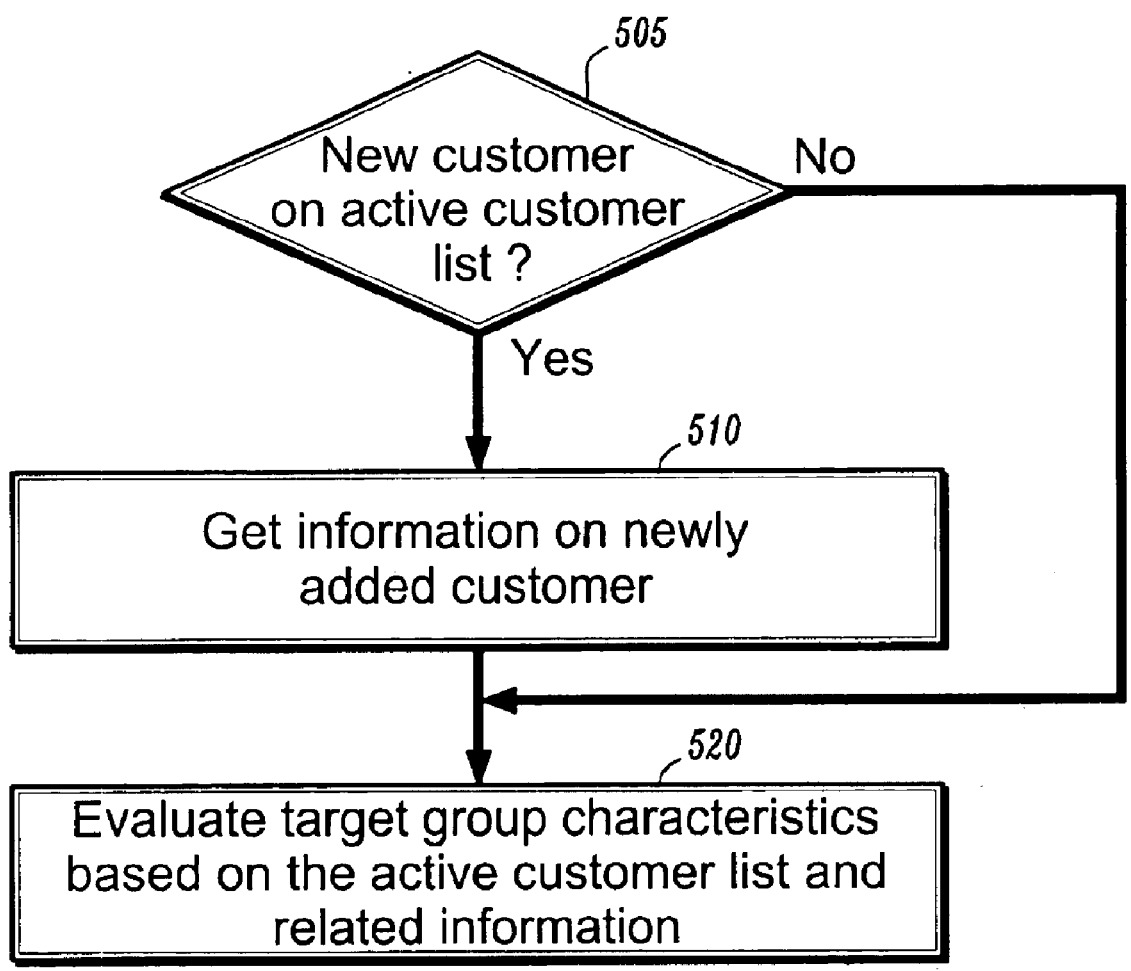
FIG. 5 is a flow chart diagram illustrating the target group evaluation routine operation of FIG. 2.

FIG. 5 depicts the flow chart diagram of the target group evaluation routine 210 operation. At step 505, it is checked if new customers have been added to the active customer list. If so, it step 510, information on the newly added customer is retrieved from the customer database 270, if available. At step 520, the target group characteristic is evaluated based on customers in the active customer list 220 and (optionally) their related information in the customer database 270.

Those skilled in the art will also appreciate that many different types of target group characteristics may be evaluated. The simplest is the size of the target group. Another is the physical location of the group or its proximity to the store. Furthermore, the customer may be partitioned into different groups based on the customer profile or location.

Figure 6:
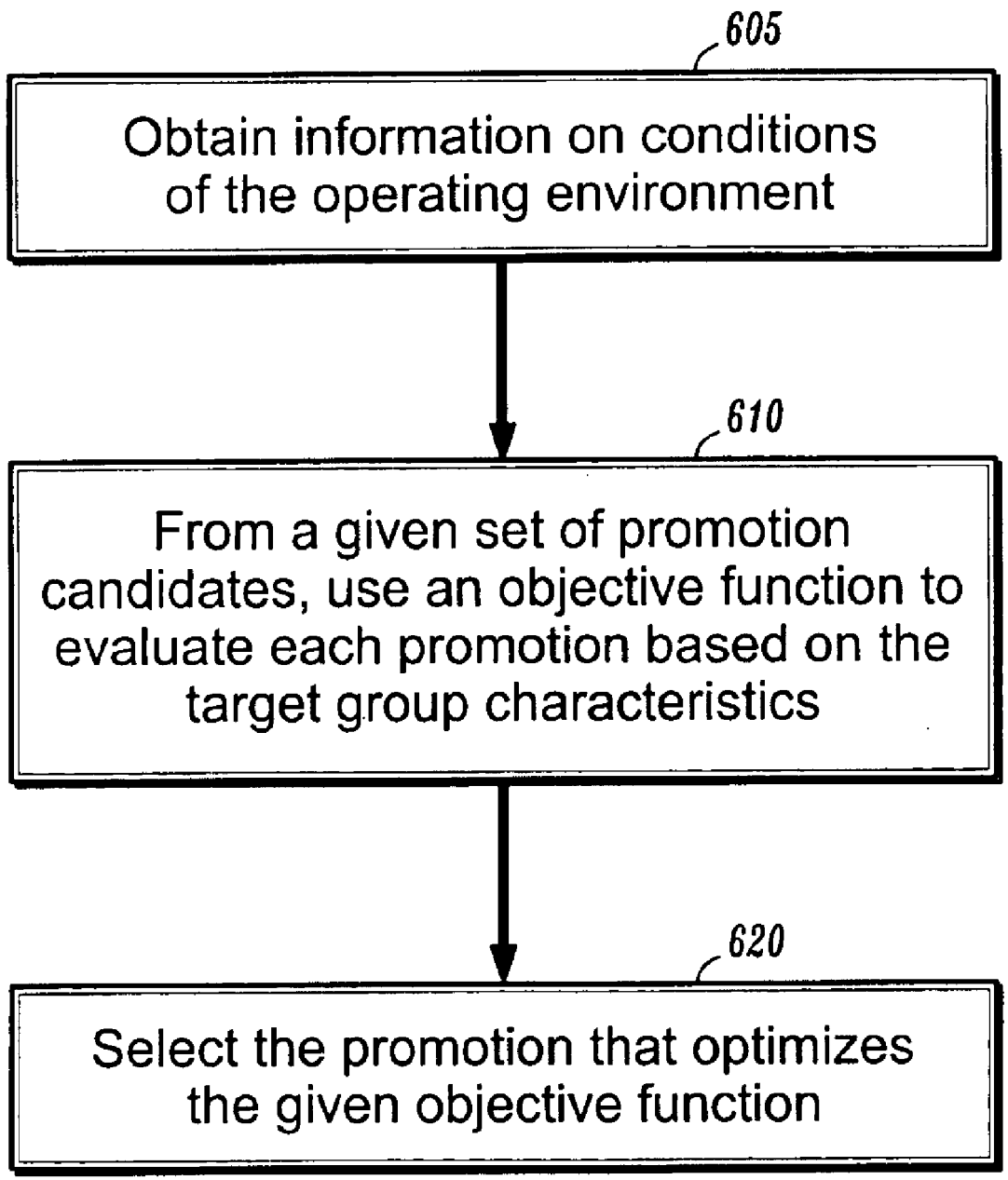
FIG. 6 is a flow chart diagram illustrating the promotion selection routine operation of FIG. 2.

FIG. 6 depicts the flow chart diagram of the promotion selection routine 215 operation. At step 605, information on the operating environment, such as the available service capacity and the inventory level of goods or services are obtained. At step 610, an objective function is used to evaluate each of several goods or services candidates based on the target group characteristics and conditions in the operating environment. At step 620, the promotions that optimize the objective function are selected.

Goods or services may be evaluated based upon a variety of objective functions. Those skilled in the art will appreciate that there are many alternative ways to select the objective function. For example, one can select the total additional profit as the promotion objective. The additional profit is equal to the number of customers taking the promotion times the profit per transaction. The number of customers taking the promotion can be estimated as the number of customers receiving the promotions multiplied by the promotion acceptance rate. The acceptance rate is a function of the attractiveness of the promotions. For example, for e-coupons, the higher the discount level, the higher the acceptance rate. Based on previous experience, a store can estimate the acceptance rate for a given discount level. Since a store only has a limited capacity or inventory, there is an upper bound on the additional customers it can handle at anytime. Using a higher discount to attract a larger number of customers that the store can handle will only reduce the profit level. By estimating the current target group size and available service capacity, the store can select the optimal discount level of the e-coupons to launch the promotion to its target group. If the customers are partitioned into different groups, each group can be evaluated separately based on the objective function and the weighted average of the objective function values for the different groups can be taken as the overall value.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. A method for providing a plurality of target groups with a plurality of promotions for a plurality of goods, using a computer server, comprised of the steps:
   a) tracking active customers for said plurality of target groups by monitoring the changes of active customers on a real-time basis in a geographical area in which customers are to receive promotions, and updating the changes of said active customers on a real-time basis;
   b) tracking the changes in operating environment for said plurality of goods and determining which of the plurality of goods are to be promoted based on the changes in operating environment;
   c) calculating target group characteristics on a real-time basis for said plurality of target groups from said active customers;
   d) calculating a plurality of promotions from a given set of promotional candidates for a plurality of goods based on promotional objectives for said plurality of target groups, wherein said promotional objectives include said target group characteristics; and
   e) disseminating by the computer server, said plurality of promotions to one or more of said plurality of target groups, wherein selection of said one or more of said plurality of target groups is dependent on changes in operating environment.

2. A method as recited in claim 1, said method further including the step of sending said plurality of promotions to said active customers for said plurality of target groups.

3. A method as recited in claim 2, wherein said plurality of promotions are sendable by broadcasting.

4. A method as recited in claim 1, said method further including the steps of:
   a) partitioning a plurality of customers into said plurality of target groups with different characteristics; and
   b) maintaining said target group characteristics for said plurality of target groups.

5. A method as recited in claim 4, wherein said target group characteristics include size of the target group and location of the target group.

6. A method as recited in claim 1, wherein said operating environment for said plurality of goods includes changes in available service capacity to service sales for said plurality of goods and changes in inventory level for said plurality of goods.

7. A method as recited in claim 1, said method further including the step of maintaining said set of promotional candidates for said plurality of target groups.

8. A method as recited in claim 1 wherein step (a) includes receiving signals from said active customers to identify and track said active customers.

9. A method as recited in claim 8, wherein said active customers includes at least one of customers with portable devices, customers with hand-held devices, customers who are viewers of a cable or pay-per-view system, and customers who are viewers of a web site.

10. A method as recited in claim 1 wherein, in step (c), the calculation of said target group characteristics for said plurality of target groups from said active customers utilizes information from a customer data base.

11. A method as recited in claim 10, wherein said customer data base includes at least one of customer profile and customer buying history.

12. A method as recited in claim 1 wherein, said promotional objectives take into account the time of date, seasonal factors, and the acceptance rate of said target group.

13. A method as recited in claim 1 wherein, the step of tracking of said active customers includes the step of detecting said active customers through the use of an electronic signaling device.

14. A method as recited in claim 13 wherein, said electronic signaling device is an RF LAN.

15. A method as recited in claim 1 wherein, the tracking of said active customers requires the use of a cookie mechanism to identify active sessions of a web site.

16. An apparatus for providing a plurality of target groups, a plurality of promotions for a plurality of goods, using a computer server, comprising:
   a) means for tracking active customers for said plurality of target groups by monitoring the changes of active customers on a real-time basis in a geographical area in which customers are to receive promotions, and updating the changes of said active customers on a real-time basis;
   b) means for tracking the changes in operating environment for said plurality of goods and determining which if the plurality of goods are to be promoted based on the changes in operating environment, wherein said changes include changes in available service capacity to service sales for said plurality of goods;

c) means for calculating target group characteristics on a real-time basis for said plurality of target groups from said active customers; and d) means for calculating a plurality of promotions from a given set of promotional candidates for a plurality of goods based on promotional objectives for said plurality of target groups, wherein said promotional objectives include said target group characteristics.

17. An apparatus as recited in claim 16, further including means for sending said plurality of promotions to said active customers for said plurality of target groups.

18. A program storage device readable by machine, tangibly embodying a program of instruction executable by the machine to perform method steps providing a plurality of target groups, a plurality of promotions for a plurality of goods, using a computing server, said method steps comprising:

a) tracking active customers for said plurality of target groups by monitoring the changes of active customers on a real-time basis in a geographical area in which customers are to receive promotions, and updating the changes of said active customers on a real-time basis;

b) tracking the changes in operating environment for said plurality of goods and determining which of the plurality of goods are to be promoted based on the changes in operating environment, wherein said changes include changes in available service capacity to service sales for said plurality of goods;

c) calculating target group characteristics on a real-time basis for said plurality of target groups from said active customers; and d) calculating a plurality of promotions from a given set of promotional candidates for a plurality of goods based on promotional objectives for said plurality of target groups, wherein said promotional objectives include said target group characteristics.

* * * * *